Figure 1:
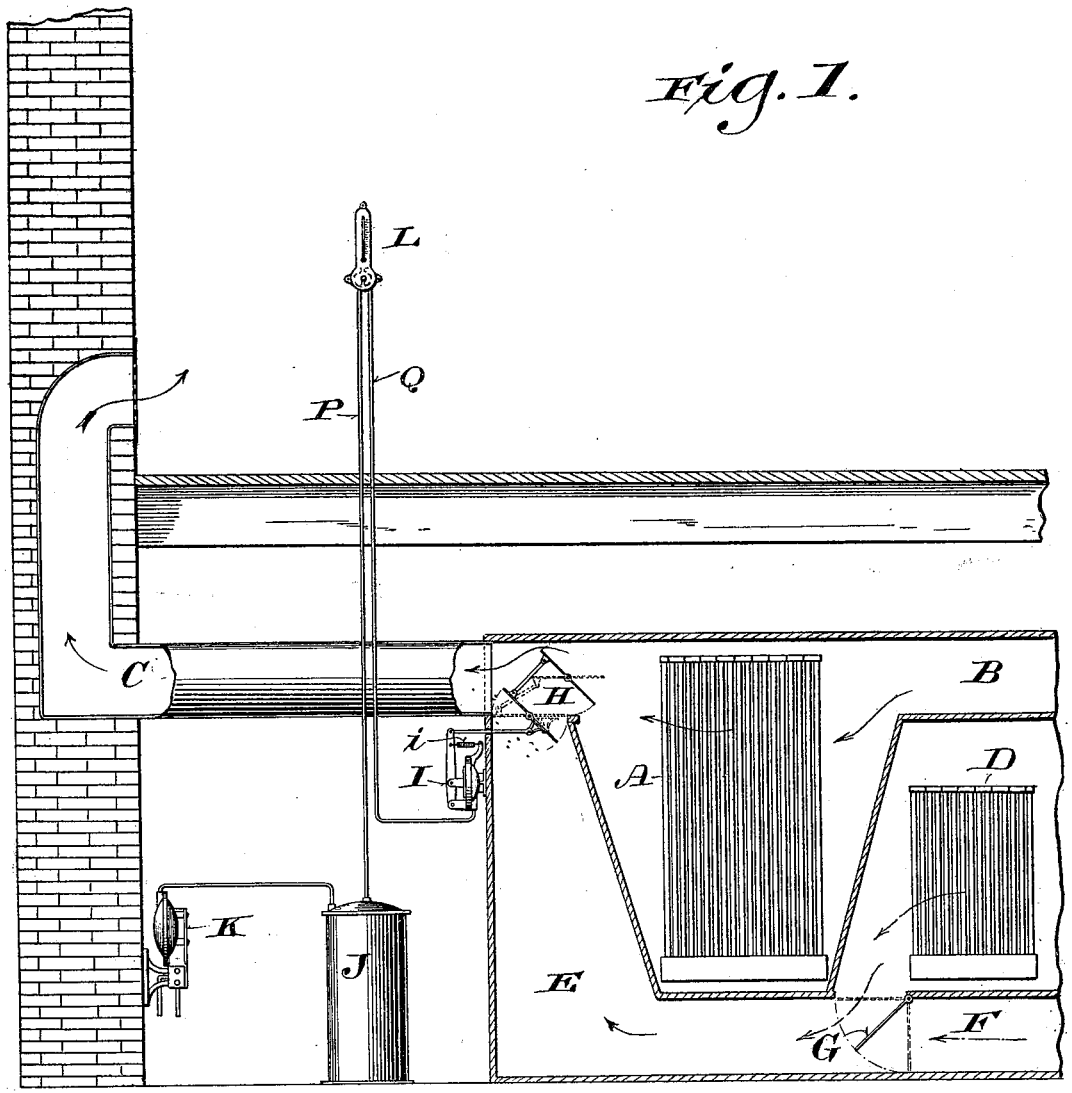

No. 624,046. Patented May 2, 1899.
W. S. JOHNSON.
TEMPERATURE REGULATING APPARATUS.
(Application filed July 27, 1898.)
(No Model.) 2 Sheets—Sheet 1.

Witnesses.
Geo. W. Young.
Chas. L. Goss.

Inventor:
Warren S. Johnson,
By Wright Rondler Smith Bottum & los.
Attorneys.

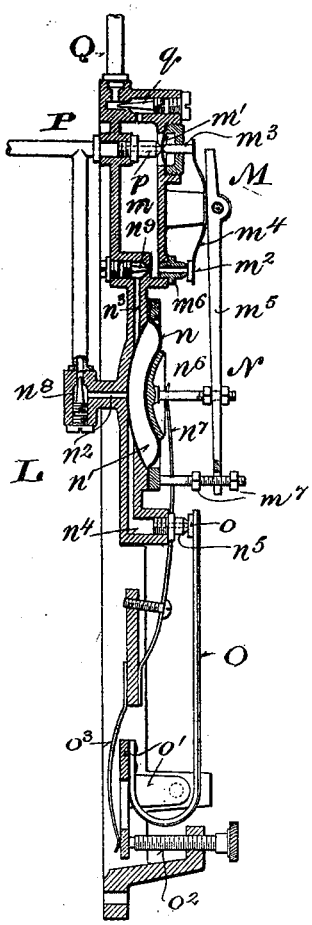

UNITED STATES PATENT OFFICE.

WARREN S. JOHNSON, OF MILWAUKEE, WISCONSIN, ASSIGNOR TO THE JOHNSON ELECTRIC SERVICE COMPANY, OF SAME PLACE.

TEMPERATURE-REGULATING APPARATUS.

SPECIFICATION forming part of Letters Patent No. 624,046, dated May 2, 1899.

Application filed July 27, 1898. Serial No. 687,031. (No model.)

*To all whom it may concern:*

Be it known that I, WARREN S. JOHNSON, a citizen of the United States, residing at Milwaukee, in the county of Milwaukee and State of Wisconsin, have invented certain new and useful Improvements in Temperature-Regulating Apparatus, of which the following is a specification, reference being had to the accompanying drawings, forming a part thereof.

My invention relates particularly to apparatus for controlling and regulating the temperature of a room or apartment which is warmed and ventilated by the introduction of warm or cool or tempered air.

The main object sought by the invention is to gradually or step by step open or close, either partially or completely, a damper or valve controlling the admission of the heating medium to a room the temperature of which is to be automatically regulated.

It consists in various novel features, details, and combinations hereinafter described.

In the accompanying drawings like letters designate the same parts in both figures.

Figure 1 is a general view or diagram, partly in vertical section and partly in elevation, illustrating the application of my invention to one form of heating and ventilating apparatus; and Fig. 2 is a sectional view of the thermostatic-valve mechanism constituting a part of the heat-regulating apparatus embodying the invention.

Referring to Fig. 1 of the drawings, A designates a main heating-coil inclosed in a casing or chamber which is supplied with air through an opening or duct B and delivers heated air into the duct C, leading to an opening into the room or apartment the temperature of which is to be controlled and regulated.

D is an auxiliary heating-coil for tempering cold air. It is also inclosed in a casing or chamber which has an opening into a duct E, leading into the duct C.

F is a duct through which air at the temperature outside is supplied to the duct E, and G is a valve or damper arranged to close more or less either the opening from the chamber of the coil D or the opening from the duct F into the duct E, and thereby control the relative supply of warm or tempered air and of cold or cool air to said duct E.

The heating apparatus above described is like or similar to that in common use and is shown merely to illustrate and explain the operation of my temperature controlling and regulating apparatus, which may be applied to various other systems or kinds of heating and ventilating apparatus.

H is a double damper, ventilator, or valve controlling the relative supply of heated and cool or tempered air from the main heating-coil A and the duct E through the duct C to the room or apartment the temperature of which is to be regulated and controlled by the apparatus. I is a fluid-pressure motor connected with and arranged to operate said damper. J represents a reservoir for holding compressed air or other suitable fluid medium for operating said motor. K is a compressor for supplying said reservoir with air or other fluid medium at the requisite pressure. When water under sufficient head or pressure is available, the compressor may be conveniently operated thereby.

L designates a thermostatic instrument for controlling the supply of the actuating fluid to and from the motor I, which operates the damper H. One of the many forms and arrangements of the mechanism for this purpose consists, as shown in Fig. 2, of supply and waste valve mechanism M, a fluid-pressure motor N for operating said mechanism, and a thermostatic expansion-strip O, all of which are preferably mounted upon the same base.

$m$ is the supply and waste valve chamber, which is connected by a supply-pipe P with the reservoir J and by a service-pipe Q with the motor I. The supply-pipe P terminates in said chamber with a nipple $p$.

$m'$ and $m^2$ are supply and waste valves. The supply-valve $m'$ consists of a flexible diaphragm secured at its edges to the valve-case and adapted to be pressed by a stem $m^3$ against the port in nipple $p$. The stem $m'$ and waste-valve $m^2$ are carried by the free ends of a spring $m^4$, which is attached at an intermediate point to a lever $m^5$ at or close to its fulcrum connection with the base of the instrument L. The waste-valve $m^2$ controls a port in a nipple $m^6$, projecting from the valve-case and opening out of the chamber $m$.

The motor N, which may be designated the "secondary" motor, comprises a flexible diaphragm $n$ or movable part, which, with the base-plate to which it is attached, forms an expansion-chamber $n'$. This chamber is connected by a passage $n^2$ with the main supply-pipe P and by an auxiliary or supplemental passage $n^3$ with the valve-chamber $m$ and has a waste-passage $n^4$ leading therefrom and terminating at its outer end in a nipple $n^5$. The diaphragm-plate $n^6$ or movable part of said motor N is connected with the lever $m^5$, the movement of which is limited in both directions at the proper points by stops $m^7$. A spring or springs $n^7$, adjustably attached to the base of the instrument, press against the diaphragm-plate $n^6$ or movable part of the motor in opposition to the fluid-pressure in the expansion-chamber $n'$.

The expansion-strip O is composed, in the usual way, of two metals or substances, such as brass and iron, having different coefficients of expansion; but in lieu of this any other kind of thermostat may be employed. It is provided with a valve $o$, which controls the waste-port in the nipple $n^5$, and is attached at one end to a plate or frame $o'$, pivoted to the base of the instrument. An adjusting-screw $o^2$, threaded in the base and bearing at its end against said plate in opposition to a spring $o^3$, affords means of readily adjusting said expansion-strip, so as to cause it to open or close the waste port or passage of the motor N at any desired degree of temperature or within certain limits. The component parts of the expansion-strip are preferably arranged in the specific construction of the instrument shown in the drawings so that a rising temperature will tend to flex said strip away from the nipple $n^5$ and to open the waste-port of the motor-chamber $n'$.

The passage from the valve-chamber $m$ to the service-pipe Q is provided with a pin-valve $q$ for restricting its area and causing the compressed air which enters said chamber to act more positively and promptly upon the secondary motor and the supply and waste valves and to restrict the action of the motor I. The main and auxiliary supply-passages $n^2$ and $n^3$ to the motor-chamber $n'$ are also provided with pin-valves $n^8$ and $n^9$ for reducing their area, so that the compressed air or other fluid medium cannot pass through them into the motor-chamber as rapidly as it is exhausted therefrom when the waste-port controlled by the thermostatic valve $o$ is fully open.

The movement of the damper H by the fluid-pressure in motor I is opposed by a spring $i$, which reacts to move the damper in the reverse direction when the fluid-pressure is withdrawn or diminished.

The apparatus as shown and described operates as follows: Assuming the damper H to be in an intermediate position, as shown in Fig. 1, and the component parts of the thermostatic-valve instrument L to be in the positions in which they are shown in Fig. 2, if the temperature in the room or apartment in which said instrument is located rises the expansion-strip O will be bent away from the nipple $n^5$, thereby increasing the opening of the exhaust-port in said nipple, so that the air will escape from the motor-chamber $n'$ faster than it can enter through the restricted openings in the main and auxiliary supply-passages $n^2$ and $n^3$, and the pressure in said chamber will be reduced, allowing the spring or springs $n^7$ to open the supply-valve $m'$, the waste-valve $m^2$ remaining closed. When this occurs, compressed air enters the valve-chamber $m$ through the supply-pipe P and increases the pressure therein and the supply therefrom to the motor-chamber $n'$ through the auxiliary passage $n^3$. The increased supply of air thus entering the motor-chamber through said auxiliary passage $n^3$, in addition to that constantly supplied through the main passage $n^2$, being greater than can escape therefrom through the waste-passage $n^4$, tends to restore the pressure in said chamber, and, acting through the lever $m^5$ against the tension of the spring or springs $n^7$, closes the supply-valve $m'$. In the meantime the increased pressure in the valve-chamber $m$ is communicated, through the service-pipe Q, to the motor I, which is thereby caused to move the double damper H an interval, increasing the opening from the cool or tempered air duct E and diminishing the opening from the hot-air chamber containing the coil A into the duct C. If now the temperature remains approximately stationary, sufficient pressure is maintained in the motor-chamber $n'$ by the thermostatic valve $o$ restricting the exhaust-port in the nipple $n^5$ to hold both the supply and waste valves $m'$ and $m^2$ closed, thus holding the double damper H in the position into which it was last moved until a further change in temperature occurs. If the temperature still continues to rise, thus increasing the opening of the exhaust-port in nipple $n^5$ by bending the expansion-strip O farther away from it, the operation last explained will be repeated until the double damper H is moved to its extreme position, completely opening the cool or tempered air duct and cutting off the warm or heated air supply. If a fall in temperature takes place when the damper H is in the position in which it is shown in Fig. 1, the expansion-strip O will be bent toward the nipple $n^5$, diminishing the size of the opening therein, so that air will enter the motor-chamber $n'$ through the passage $n^2$ faster than it can escape through the passages $n^3$ and $n^4$, the pressure in said chamber will be increased, and, acting against the tension of the spring or springs $n^7$ through the diaphragm $n$ and lever $m^5$, will open the waste-valve $m^2$, while the supply-valve $m'$ remains closed. This will reduce the pressure in the valve-chamber $m$ and also in the motor I. The double damper H will thus be turned an interval by the reaction of the spring $i$, diminishing the opening from the cold-air duct E and increasing the opening from the hot or warm air chamber. The reduced pressure in said chamber $m$ will increase the flow of air from the motor-chamber $n'$ and, reducing the pressure therein, allow the spring or springs $n^7$ to close the waste-valve $m^2$. If now the temperature remains stationary and both the supply and waste valves remain closed, the double damper H will remain stationary until there is a further change in temperature; but if the temperature continues to fall the operation last explained will be repeated until the cool or tempered air duct E is completely closed and the hot or warm air supply is fully opened.

I do not wish to be understood as limiting myself to the details of construction herein shown and described, since any construction and arrangement of the valve mechanism controlling the supply of fluid-pressure to the damper-motor, the secondary motor for operating said valve mechanism, and the thermostat for controlling the operation of said motor, whereby the operation of said valve mechanism primarily by fluid-pressure thermostatically controlled is supplemented, limited, or modified by the fluid-pressure controlled by said valve mechanism itself, come within the spirit and intended scope of my invention, and in place of a thermostatic expansion-strip composed of metals or substances having different coefficients of expansion any other known form of thermostat may be used.

I claim—

1. In temperature-regulating apparatus the combination with a damper or main valve, a fluid-pressure motor for operating the same and valve mechanism controlling the supply of fluid-pressure to said motor, of a second fluid-pressure motor having a supply and waste, one of which is thermostatically controlled, the second fluid-pressure motor primarily operating said valve mechanism but said operation being supplemented, limited or modified by the fluid-pressure admitted to the first motor by said valve mechanism, substantially as and for the purposes set forth.

2. In temperature-regulating apparatus the combination with an air-controlling damper or valve and a fluid-pressure motor for operating the same, of valve mechanism controlling the supply of the actuating medium to said motor, and a second fluid-pressure motor for operating said valve mechanism, having a fluid-supply connection and a waste passage or opening, one of which is thermostatically controlled, said valve mechanism being constructed and arranged to supplement, limit or modify its own movement produced by the fluid-pressure which is thermostatically controlled, substantially as and for the purposes set forth.

3. In apparatus for regulating temperature the following elements in combination: a source of fluid-pressure supply; a damper or valve for controlling the air-supply of an apartment; a fluid-pressure motor for operating said air-controlling damper or valve; a suitable supply and waste valve mechanism connected with said source of fluid-pressure supply and with said fluid-pressure motor; a second fluid-pressure motor for operating said supply and waste valve mechanism, having a waste passage or opening and a constant connection with a source of fluid-pressure supply; a passage connecting the secondary motor with the fluid connection between the supply and waste valve mechanism and the motor of the air-controlling damper or valve; a third valve for varying the relative supply and waste of fluid-pressure to the secondary motor through its said connections and the waste passage or opening controlled by said third valve; and a thermostat adapted and arranged to bring the third valve into action upon a change of temperature in the medium surrounding said thermostat and thus to open, close or change the position of the air-controlling damper or valve; the passage connecting said secondary motor with the fluid connection between the supply and waste valve mechanism and the motor of the air-controlling damper or valve serving to limit, supplement or modify the movement of said supply and waste valve mechanism effected primarily by the fluid-pressure thermostatically controlled, substantially as and for the purposes set forth.

4. In temperature-regulating apparatus the combination with a heat-controlling damper or valve and a fluid-pressure motor for operating the same, of valve mechanism controlling the supply of the fluid-pressure medium to said motor, a second fluid-pressure motor for operating said valve mechanism, having two fluid-pressure-supply connections and a thermostat controlling the relative supply and waste of one of said connections, the other connection being controlled by said valve mechanism, substantially as and for the purposes set forth.

5. In temperature-regulating apparatus the combination with a heat-controlling damper or valve, a fluid-pressure motor for operating the same and a source of fluid-pressure supply connected therewith, of supply and waste valve mechanism controlling the supply and release of the fluid medium to and from said motor, and a secondary motor having connections with the source of fluid-pressure supply, one of which connections leads directly from said source of supply and is constantly open, the other leading through and being controlled by said supply and waste valve mechanism and a waste to said secondary motor thermostatically controlled, substantially as and for the purposes set forth.

6. In heat-regulating apparatus the combination of a damper or valve, a fluid-pressure motor for operating the same, valve mechanism controlling the supply and release of the fluid medium to and from said motor, a secondary fluid-pressure motor for operating said valve mechanism having a main fluid-supply connection and an exhaust port or passage of normally larger area and having an auxiliary fluid-supply connection controlled by said supply and waste valve mechanism and a thermostatically-actuated valve controlling said exhaust port or passage, substantially as and for the purposes set forth.

7. In temperature-regulating apparatus the combination with a damper or main valve and a fluid-pressure motor for operating the same, of valve mechanism controlling the supply and release of the fluid medium to and from said motor; a secondary fluid-pressure motor for operating said valve mechanism, having main and auxiliary fluid-pressure-supply connections and a waste connection of normally larger area than said main supply connection; a thermostat controlling said waste connection, the auxiliary supply connection being controlled by said valve mechanism; and a source of fluid-pressure supply independent of the thermostat which controls its connection with said secondary motor, substantially as and for the purposes set forth.

8. In temperature-regulating apparatus the combination with a damper or main valve and a fluid-pressure motor for operating the same, of valve mechanism controlling the fluid-pressure supply in said motor; a secondary fluid-pressure motor for operating said valve mechanism having a main fluid-supply connection and a waste-port, one of which is thermostatically controlled independently of the source of fluid-pressure; and an auxiliary fluid-pressure-supply connection controlled by said valve mechanism and serving to supplement, limit or modify the action of the secondary motor which is produced by its main fluid-supply connection, substantially as and for the purposes set forth.

9. In temperature-regulating apparatus the combination with a heat-controlling damper or valve, a fluid-pressure motor for operating the same and a source of fluid-pressure supply for said motor, of valve mechanism controlling the supply of fluid-pressure to said motor and a secondary fluid-pressure motor for operating said valve mechanism, having an expansion-chamber which is provided with fluid supply and waste connections, one of which is thermostatically controlled independently of the source of fluid-pressure, and with an auxiliary fluid connection controlled by said valve mechanism, whereby the initial movement of said valve mechanism, effected by thermostatic action, is checked, limited or modified by the fluid-pressure controlled by said valve mechanism itself, substantially as and for the purposes set forth.

10. In temperature-regulating apparatus the combination with a heat-controlling damper or valve, a fluid-pressure motor for operating the same and a source of fluid-pressure supply for said motor, of valve mechanism controlling the supply and release of fluid-pressure to and from said motor and a secondary fluid-pressure motor for operating said valve mechanism, having an expansion-chamber which is provided with fluid supply and waste connections, one of which is thermostatically controlled independently of the source of fluid-pressure, and with an auxiliary fluid connection controlled by said supply and waste-valve mechanism, whereby the initial movement of said valve mechanism, effected by thermostatic action, is checked, limited or modified by the fluid-pressure controlled by said valve mechanism itself, substantially as and for the purposes set forth.

11. In temperature-regulating apparatus the combination with a heat-controlling damper or valve, a fluid-pressure motor for operating the same and a source of fluid-pressure supply for said motor, of valve mechanism comprising a chamber which has a supply connection with the source of fluid-pressure, a service connection with said motor, a waste port or passage, a supply-valve controlling the supply-port and a waste-valve controlling the waste-port, and a secondary fluid-pressure motor for operating said supply and waste valves having an expansion-chamber which is provided with fluid supply and waste connections, one of which is thermostatically controlled, and with an auxiliary fluid connection with said valve-chamber, an increase of the pressure thermostatically controlled in the expansion-chamber of the secondary motor tending to close the supply-valve and open the waste-valve, whereby the initial operation of said motor and valve mechanism is checked, limited or modified by the release of the fluid medium from said secondary motor through its auxiliary fluid connection, substantially as and for the purposes set forth.

12. In temperature-regulating apparatus the combination with a damper or valve for controlling the heat-supply and a fluid-pressure motor for operating said damper or valve, of valve mechanism controlling the operation of said motor, a second fluid-pressure motor for operating said valve mechanism, a thermostat, a source of fluid-pressure supply independent of the thermostat, and a valve actuated by said thermostat and controlling the fluid-pressure which is supplied from said source and produces initial movement of said second motor and valve mechanism, said second motor and valve mechanism being so constructed, connected and arranged that their initial movement effected by the thermostatically-controlled pressure, is checked or modified by the variations produced by said valve mechanism in the service-pressure, substantially as and for the purposes set forth.

In witness whereof I hereto affix my signature in presence of two witnesses.

WARREN S. JOHNSON.

Witnesses:
CHAS. L. GOSS,
ALFRED MORAWETZ.